(12) United States Patent
Buer

(10) Patent No.: US 6,523,118 B1
(45) Date of Patent: Feb. 18, 2003

(54) SECURE CACHE FOR INSTRUCTION AND DATA PROTECTION

(75) Inventor: Mark Leonard Buer, Gilbert, AZ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/106,717

(22) Filed: Jun. 29, 1998

(51) Int. Cl.[7] .................................................. H04L 9/32
(52) U.S. Cl. ....................... 713/189; 713/187; 713/190; 713/192; 713/193; 713/194; 380/28
(58) Field of Search ................................ 713/187, 189, 713/190, 192, 193, 194; 380/28

(56) References Cited

U.S. PATENT DOCUMENTS

| | | | | |
|---|---|---|---|---|
| 4,847,902 A | * | 7/1989 | Hampson | 713/190 |
| 5,224,166 A | * | 6/1993 | Hartman, Jr. | 713/190 |
| 5,386,469 A | * | 1/1995 | Yearsley et al. | 713/190 |
| 5,568,552 A | * | 10/1996 | Davis | 705/59 |
| 5,757,919 A | * | 5/1998 | Herbert et al. | 713/187 |
| 5,825,878 A | * | 10/1998 | Takahashi et al. | 713/190 |
| 6,061,449 A | * | 5/2000 | Candelore et al. | 380/28 |

OTHER PUBLICATIONS

Hamacher, V. Computer Organization. McGraw Hill. 1978. Pp. 245–254.*

* cited by examiner

*Primary Examiner*—Gail Hayes
*Assistant Examiner*—James Seal
(74) *Attorney, Agent, or Firm*—Peter Zawilski

(57) ABSTRACT

A computing system, includes a processor, a cache, a memory system, and a secure cache controller system. The cache stores a plurality of cache lines. The memory system stores a plurality of blocks of encrypted data. The secure cache controller system is situated between the memory system and the cache. When there is a miss of a first cache line of data in the cache and the first cache line of data resides in a first block of encrypted data within the memory system, the secure cache controller system fetches the first block of encrypted data, decrypts the first block of encrypted data and forwards the first cache line to the cache.

15 Claims, 2 Drawing Sheets

SECURE CACHE FOR INSTRUCTION AND DATA PROTECTION

BACKGROUND

The present invention concerns memory management in a computer system designs and pertains particularly to a secure cache for instruction and data protection.

In order to protect against theft or misuse, secure information within a computing system can be encrypted before being stored in the memory for the computing system. When a secure integrated circuit uses the secure information, the secure information is transferred to the integrated circuit and decrypted before being used. Secure information returned to the memory for the computing system is encrypted before being stored.

Typically, decryption and encryption is handled by a secure memory management unit (SMMU) on the integrated circuit. When a processor requires the use of a page of secure information, the secure memory management unit on the integrated circuit obtains the page of secure information, decrypts the page of secure information and places the data in a cache memory for access by the processor. The cache is typically managed by the SMMU and is implemented using static random access memory (SRAM).

If, in order to bring in the page of secure information, a "dirty" page of information needs to be swapped out to memory, the SMMU performs the swap out of the "dirty" page of information before the new page is placed in the cache. A "dirty" page of information is a page of information which has been written to while in the cache where the changes made have not been written out to the system memory. If the "dirty" page of information contains secure information, the SMMU first encrypts the page before swapping the page out to system memory. While performing page swapping the SMMU holds off the processor while pages are being swapped to and from the processor cache.

In order to lessen the amount of hardware used to implement an hardware SMMU, a hardware direct memory access (DMA) device can be added to the integrated circuit to detect a page miss by the processor. After detecting a page miss, the device DMA holds off the processor until the device DMA has loaded and decrypted the next page of information. This requires the device DMA to sit in-line with the processor and the memory subsystem. The device DMA hardware also has to move the data through the encryption core and into the cache memory space. Such an implementation requires special care to meet timing and memory bus requirements. See, for example, the VLSI Part Number VMS 310 and VLSI Part Number VMS 320 both available from VLSI Technology, Inc., having a business address of 1109 McKay Drive, San Jose, Calif. 95131.

One problem with prior art SMMUs as described above is that they do not take into account processor blocks which already include a cache circuit. Additionally, the cache implementation can result in poor performance because every time there is a cache miss, an entire page of information must be first decrypted and placed in the cache before it can be utilized by the processor.

SUMMARY OF THE INVENTION

In accordance with the preferred embodiment of the present invention, a computing system, includes a processor, a cache, a memory system, and a secure cache controller system. The cache stores a plurality of cache lines. The memory system stores a plurality of blocks of encrypted data. The secure cache controller system is situated between the memory system and the cache. When there is a miss of a first cache line of data in the cache and the first cache line of data resides in a first block of encrypted data within the memory system, the secure cache controller system fetches the first block of encrypted data, decrypts the first block of encrypted data and forwards the first cache line to the cache.

The secure cache controller system includes, for example, a secure cache controller and an encryption and buffering block. In addition, to the memory system storing a plurality of blocks of encrypted data, the memory system can additionally store clear data.

In the preferred embodiment, the secure cache controller system forwards the first cache line to the cache when the first cache line is decrypted, even though the secure cache controller has not completed decrypting all of the first block of encrypted data. Once the secure cache controller system has completed decrypting all of the first block of encrypted data, the secure cache controller system stores the first block of encrypted data in a buffer in case additional accesses are made to cache lines of data within the first block. In the preferred embodiment, before the secure cache controller system fetches the first block of encrypted data, the secure cache controller system checks to see whether the first block has already been decrypted and is buffered within the secure cache controller system.

When a second cache line of data is written from the cache, the secure cache controller system accesses from the memory system a second block of encrypted data within the memory system, decrypts the second block of encrypted data and places the second cache line of data into the second block of encrypted data. After the secure cache controller system places the second cache line of data into the second block of encrypted data, the secure cache controller system encrypts the second block of encrypted data and returns the second block of encrypted data to the memory system. In the preferred embodiment, before the secure cache controller system fetches the second block of encrypted data, the secure cache controller system checks to see whether the second block has already been decrypted and is buffered within the secure cache controller system.

The secure cache architecture described herein has a distinct advantage in speed over a conventional block decryption design. As described herein, the secure cache controller need only decrypt a fetched encrypted block until the secure cache controller has decrypted a sought after cache line before forwarding the cache line to the cache. Without delaying the processor, the remaining portion of the encrypted block can be decrypted and stored locally to be ready for sequential cache line misses. The secure cache can take advantage of a posted write buffer since the encryption and decryption of the modified encryption block data can take place without halting processor operation.

The encryption blocks of data can be much larger than the cache line without affecting the performance of the processor system. This will make the encryption stronger for the external data and instructions.

DESCRIPTION OF THE PREFERRED EMBODIMENT

Figure 1:
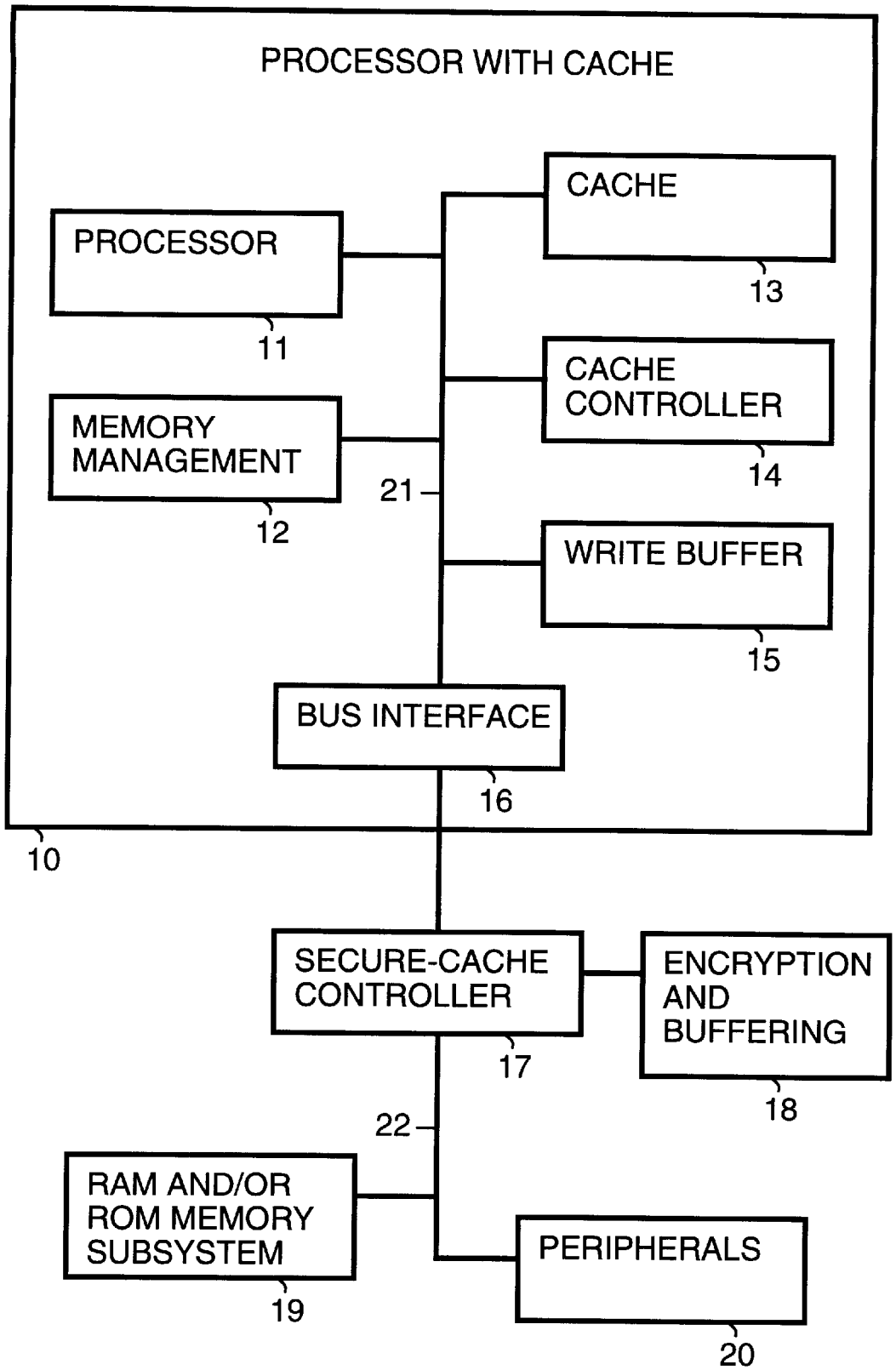
FIG. 1 is a simplified block diagram of a system which utilizes a secure-cache controller in accordance with a preferred embodiment of the present invention.

FIG. 1 is a simplified block diagram of a system which utilizes a secure-cache controller 17. The system includes a memory subsystem 19, connected to a system bus 17. Memory subsystem 19 includes random access memory (RAM) and/or read only memory (ROM). Various peripherals 20 may also be connected to system bus 22.

A processor block 10 includes a processor 11, a cache 12, a cache controller 14 and a bus interface 16 connected to an internal bus 21. Optionally, processor block 10 additionally includes a memory management block 12 and a write buffer 15.

Cache 13 is a small, high-speed buffer memory that is used by processor block 10 to temporarily store portions of the contents of memory subsystem 19. In selecting which portions of the contents of memory subsystem 19 to store, a cache controller 14 estimates which data will soon be requested by processor 11. The increased access speed of cache 13 memory generally results in a reduction in the average time necessary for processor 11 to access data from memory subsystem 19.

Cache memory 13 consists of many blocks of one or more words of data. Each block has associated with it an address tag. The address tags of data blocks currently residing in cache 13 memory are stored in a cache directory. Each address tag uniquely identifies a block of data in the memory subsystem 19. Each time processor 11 makes a memory reference, a comparison is made between an address tag of the accessed data and the address tags in cache 13 directory. If the desired data is in cache 13, cache 13 provides the data to processor. If the desired memory block is not in cache 13, the block of data containing the requested data is retrieved from the memory subsystem 19, stored in cache 13 and supplied to processor 11.

In addition to using a cache to retrieve data from memory subsystem 19, processor 11 may also write data into cache 13. Data is written to cache 13 instead of writing the data directly to the memory subsystem 19, or, in a write-through cache, data is written to cache 13 concurrent with writing the data to the memory subsystem 19. When processor 11 desires to write data to the memory, cache controller 14 checks the cache directory to determine if the data block into which data is to be written resides in cache 13. If the data block exists in cache 13, processor 11 writes the data into the data block in cache 13. If the data block into which data is to be written is not in cache 13, the data block must be fetched into cache 13 or the data written directly into the memory subsystem 19.

The secure cache controller 17 is shown implemented as an additional block to the standard processor cache system within processor block 10. Alternatively, secure cache controller could be embedded into processor block 10.

Cache 13 contains clear data and instructions that processor 11 can manipulate. However, at least some of the data and instructions stored in memory subsystem 19 are encrypted. When encrypted data or instructions are to be utilized by processor 11, secure cache controller 17 utilizes an encryption and buffering block 18 to generate clear data from encrypted data. Secure cache controller 17 uses buffering capacity within encryption and buffering block 18 so that secure cache controller 17 can align the cache lines to blocks of encrypted data. The clear data is forwarded to processor 11 and stored in cache 13. When processor 11 or cache controller 11 returns the data to memory subsystem 19, secure cache controller 17 encrypts the data before the data is returned to memory subsystem 19. In this way no data encrypted within memory subsystem 19 is ever exposed as clear data on system bus 22. Additionally, secure cache controller 17 uses buffering capacity within encryption and buffering block 18 so that secure cache controller 17 can align the cache lines to blocks of encrypted data.

Figure 2:
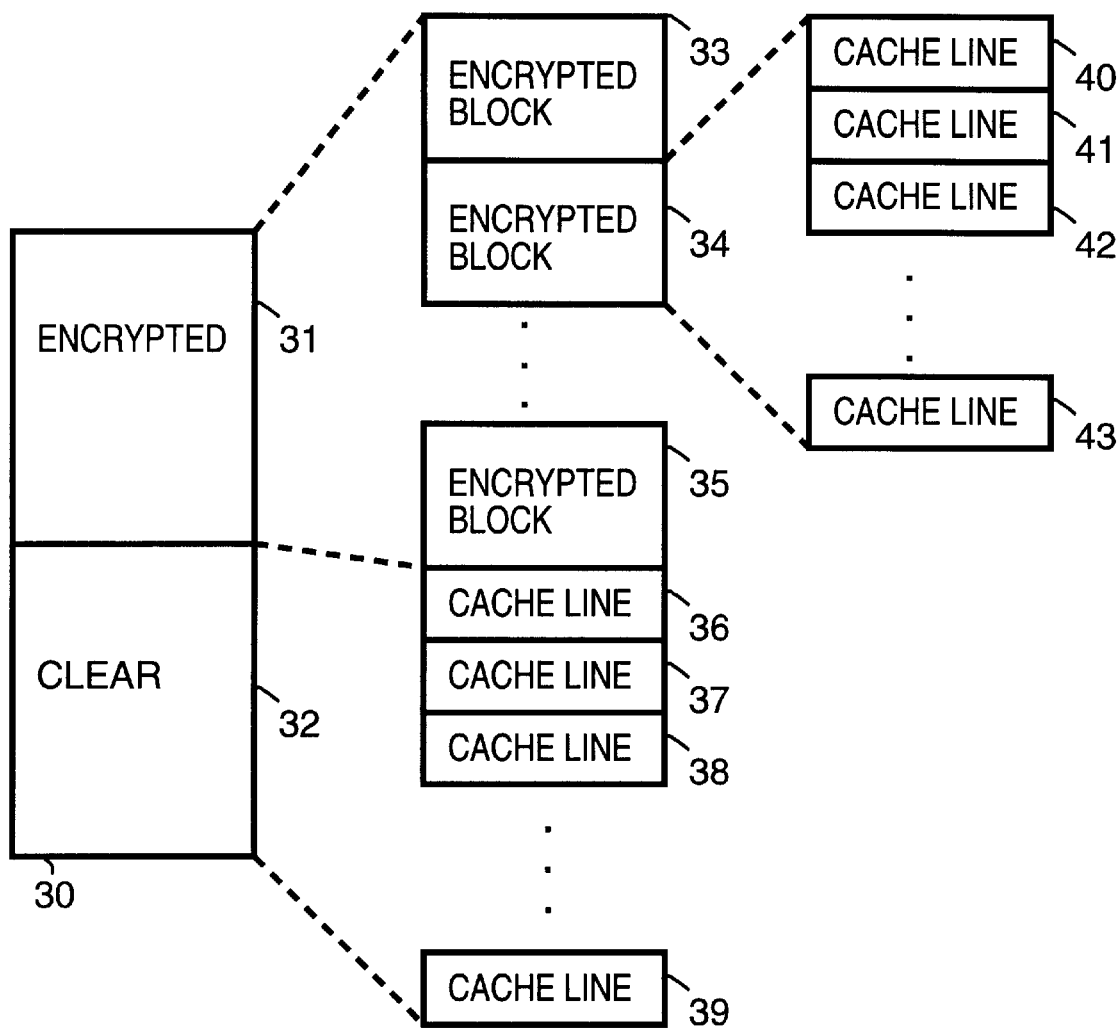
FIG. 2 is a simplified block diagram which illustrates memory usage in the system shown in FIG. 1 in accordance with a preferred embodiment of the present invention.

As illustrated by FIG. 2, memory subsystem 19 can contain a combination of encrypted and clear data. For example, FIG. 2 shows an address space 30 of memory subsystem 19. An encrypted memory space 31 of address space 30 is used to store encrypted data. A clear memory space 32 of address space 30 is used to store clear data.

Encrypted memory space 31 is divided into encrypted blocks. This is represented in FIG. 2 by an encryption block 33, an encryption block 34 and an encryption block 35. The actual number of encryption blocks varies based on the size of encrypted memory space 31. Each encrypted block includes, for example, 128 words of data or instructions. Alternatively, the size of the encrypted block can vary as necessary for optimal use by particular processors.

Each encrypted block is divided into cache lines of data. For example, encrypted block 34 is shown divided into cache lines represented by a cache line 40, a cache line 41, a cache line 42 and a cache line 43. In the preferred embodiment, each cache line is four words, so each encrypted block is divided into thirty-two cache lines. The size of the cache lines can vary as necessary for optimal use by particular processors.

In the preferred embodiment, the encryption blocks of data are chosen to be much larger than the cache lines. This makes the encryption stronger for the external data and instructions. For example, if the encryption block were one instruction and each instruction was encrypted as a separate encryption block, an attacker could learn about the system by considering the statistical occurrence of each type of instruction. For example, if a branch instruction is used most often, then the attacker could look for the pattern that was repeated most often. Such use of statistical analysis, however, becomes much more difficult if the instructions are encrypted together in larger blocks the larger the blocks, the more difficult the statistical analysis.

An additional reason for using a larger block size is the overhead required to fetch a block of data and to decrypt that block of data. Generally, for this purpose, a pipeline is established. Thus decrypting larger blocks of data and buffering the additionally decrypted data to satisfy potential cache misses, resulting, for example, from sequential memory accesses, can significantly lower overall system latency.

Clear memory space 32 is divided into cache lines as represented by a cache line 37, a cache line 37, a cache line 38 and a cache line 39. In the preferred embodiment, each cache line is four words. As stated above, the size of the cache lines can vary as necessary for optimal use by particular processors. The actual number of cache lines is based on the size of clear memory space 32 and the chosen size of the cache line.

Secure cache controller 17 intercept accesses by processor 11 to encrypted space in the memory subsystem 19. Particularly, when processor 11 makes an access to a memory location within encrypted memory space 31, and there is a cache miss, secure cache controller 17 recognizes the cache line that is being fetched into cache 13 as coming from encrypted memory space 31.

If the cache line is not already buffered in encryption and buffering block 18, secure cache controller 17 will fetch the entire block of encrypted data which includes the cache line. The fetched block of encrypted data will be decrypted and stored in encryption and buffering block 18.

During decryption of the fetch block of encrypted data, once the cache line of interest is decrypted, the cache line is immediately forwarded to bus interface 16 to be placed in cache 13. This allows for quicker accesses since on average a cache line will be forwarded to cache 13 when only half an encrypted block has been decrypted.

Encryption and buffering block 18 will continue to decrypt the entire encrypted block and store the decrypted block within local buffering in encryption and buffering block 18. The generated clear data is buffered in order to allow for multiple cache lines to be accessed without having to decrypt the block again. This is done independent of processor block 10, and thus does not penalize operation of processor block 10.

Depending on buffering space, multiple blocks can be buffered in encryption and buffering block 18. In the preferred embodiment, encryption and buffering block 18 can buffer up to four blocks at a time. More or fewer blocks can be buffered depending upon devoted buffer space.

When a cache line of data, which is within encrypted memory space 31, is being written from cache 13 to a memory location in memory subsystem 29, secure cache controller 17 will check to see if the pertinent block of data is stored in encryption and buffering block 18. If so, secure cache controller 17 will write the cache line into the clear data buffered in encryption and buffering block 18.

If the pertinent block of data is not stored in encryption and buffering block 18, secure cache controller 17 will fetch the block of encrypted data from encrypted memory space 31. Secure cache controller 17 will then use encryption and buffering block 18 to decrypt the data. Secure cache controller 17 will then replace the cache line of data in the decrypted data block. Because this data block is now dirty, when this data block is moved out of encryption and buffering block 18, encryption and buffering block 18 ill encrypt the block before secure cache controller 17 returns the encrypted lock to memory subsystem 19 in encrypted form.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A computing system, comprising:

a processor;

a cache, coupled to the processor, the cache storing a plurality of cache lines, the processor utilizing data stored in the cache;

a memory system, the memory system storing a plurality of blocks of encrypted data; and, a secure cache controller system, coupled to the memory system and the cache, the secure cache controller system being in addition to the processor, wherein when there is a miss of a first cache line of data in the cache and the first cache line of data resides in a first block of encrypted data within the memory system, the secure cache controller system fetches the first block of encrypted data, decrypts the first block of encrypted data and forwards the first cache line to the cache, wherein before the secure cache controller system fetches the first block of encrypted data, the secure cache controller system checks to see whether the first block has already been decrypted and is buffered within the secure cache controller system.

2. A computing system as in claim 1 wherein the memory system additionally stores clear data.

3. A computing system as in claim 1 wherein the secure cache controller system forwards the first cache line to the cache when the first cache line is decrypted, even though the secure cache controller has not completed decrypting all of the first block of encrypted data.

4. A computing system as in claim 1 wherein once the secure cache controller system has completed decrypting all of the first block of encrypted data, the secure cache controller system stores the first block of encrypted data in a buffer in case additional accesses are made to cache lines of data within the first block.

5. A computing system as in claim 1 wherein the secure cache controller system comprises:

a secure cache controller; and, an encryption and buffering block.

6. A computing system as in claim 1 wherein when a second cache line of data is written from the cache, the secure cache controller system accesses from the memory system a second block of encrypted data within the memory system, decrypts the second block of encrypted data and places the second cache line of data into the second block.

7. A computing system as in claim 6 wherein after the secure cache controller system places the second cache line of data into the second block of encrypted data, the secure cache controller system encrypts the second block of encrypted data and returns the second block of encrypted data to the memory system.

8. A computing system as in claim 6 wherein before the secure cache controller system fetches the second block of encrypted data, the secure cache controller system checks to see whether the second block has already been decrypted and is buffered within the secure cache controller system.

9. A method for providing security for a plurality of blocks of encrypted data stored in a memory system, comprising the steps of:

(a) storing, by a secure cache controller system, a plurality of cache lines in a cache, the plurality of cache lines holding data to be used by a processor, wherein the secure cache controller system is not the processor; and (b) performing, by the secure cache controller system, the following substeps when there is a miss of a fist cache line of data in the cache and the first cache line of data resides in a first block of encrypted data within the memory system:

(b.1) checking to see whether the first block has already been decrypted and is buffered in a local buffer, (b.2) fetching the first block of encrypted data, (b.3) decrypting the first block of encrypted data, and (b.4) forwarding the first cache line to the cache.

10. A method as in claim 9 wherein the memory system additionally stores clear data.

11. A method as in claim 9 wherein in substep (b.3), the first cache line is forwarded to the cache once the first cache line has been decrypted, even though the first block of encrypted data has not been completely decrypted.

12. A method as in claim 9 wherein step (b) additionally includes the following substep:

(b.4) once the first block of encrypted data has been completely decrypted, storing the first block of encrypted data in a buffer in case additional accesses are made to cache lines of data within the first block.

13. A method as in claim 9 additionally comprising the following step:
   (c) performing the following substeps when a second cache line of data is written from the cache:
      (c.1) accessing from the memory system a second block of encrypted data within the memory system,
      (c.2) decrypting the second block of encrypted data, and
      (c.3) placing the second cache line of data into the second block.

14. A method as in claim 13 wherein step (c) additionally includes the following substeps performed after substep (c.3):
   (c.4) encrypting the second block of encrypted data, and
   (c.5) returning the second block of encrypted data to the memory system.

15. A method as in claim 13 wherein step (c) includes, before performing substep (c.1), checking to see whether the second block has already been decrypted and is buffered in a local buffer.

* * * * *